United States Patent
Weber et al.

(10) Patent No.: US 9,739,916 B2
(45) Date of Patent: Aug. 22, 2017

(54) CIRCADIAN RHYTHM OPTICAL FILM

(71) Applicant: 3M INNOVATIVE PROPERTIES COMPANY, St. Paul, MN (US)

(72) Inventors: Michael F. Weber, Shoreview, MN (US); Jonathan T. Kahl, St. Paul, MN (US); Glenn E. Casner, Woodbury, MN (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 106 days.

(21) Appl. No.: 14/220,193

(22) Filed: Mar. 20, 2014

(65) Prior Publication Data
US 2015/0268396 A1    Sep. 24, 2015

(51) Int. Cl.
*G02C 7/10* (2006.01)
*G02B 5/28* (2006.01)
*G02B 5/20* (2006.01)
*B32B 27/08* (2006.01)

(52) U.S. Cl.
CPC ............. *G02B 5/282* (2013.01); *G02C 7/104* (2013.01); *B32B 27/08* (2013.01); *G02B 5/20* (2013.01); *G02C 7/10* (2013.01); *G02C 7/107* (2013.01); *G02C 7/108* (2013.01)

(58) Field of Classification Search
CPC .......... G02C 7/10; G02C 7/104; G02C 7/107; G02C 7/108; B32B 27/08; G02B 5/20; G02B 5/282
USPC .......................... 351/159.24, 159.29, 159.32, 351/159.61–159.66; 359/589–590; 359/722–723
See application file for complete search history.

(56) References Cited

U.S. PATENT DOCUMENTS

| | | | | |
|---|---|---|---|---|
| 5,218,386 A | * | 6/1993 | Levien | G02C 7/104 |
| | | | | 348/E13.037 |
| 5,646,781 A | * | 7/1997 | Johnson, Jr. | G02B 5/288 |
| | | | | 359/588 |
| 5,882,774 A | | 3/1999 | Jonza | |
| 5,922,246 A | * | 7/1999 | Matsushita | G02B 1/041 |
| | | | | 252/582 |
| 6,096,375 A | | 8/2000 | Ouderkirk | |
| 6,145,984 A | | 11/2000 | Farwig | |
| 6,157,490 A | | 12/2000 | Wheatley | |
| 6,350,275 B1 | * | 2/2002 | Vreman | A61M 21/00 |
| | | | | 607/88 |

(Continued)

FOREIGN PATENT DOCUMENTS

| WO | WO 2011-141840 | 11/2011 |
|---|---|---|
| WO | WO 2011/146288 | 11/2011 |

OTHER PUBLICATIONS

Albrecht, "Timing to Perfection: The Biology of Central and Peripheral Circadian Clocks," Neuron, 2012, vol. 74, No. 2, pp. 246-260.

(Continued)

*Primary Examiner* — Thomas K Pham
*Assistant Examiner* — Nicholas R Pasko

(57) ABSTRACT

An optical film includes a polymeric bandstop filter reflecting a band of blue light in a range from 440 nm to 480 nm a polymeric bandstop filter reflecting a band of blue light in a range from 440 nm to 480 nm and transmitting greater than 50% of blue light at a wavelength of 10 nm longer than a long wavelength band edge and at a wavelength of 10 nm shorter than a short wavelength band edge.

18 Claims, 3 Drawing Sheets

(56) References Cited

U.S. PATENT DOCUMENTS

| | | | |
|---|---|---|---|
| 6,531,230 B1* | 3/2003 | Weber | B32B 7/02 428/357 |
| 6,676,859 B2 | 1/2004 | Hartley | |
| 6,783,349 B2 | 8/2004 | Neavin | |
| 6,926,405 B2 | 8/2005 | Ambler | |
| 6,955,430 B2* | 10/2005 | Pratt | A61F 9/022 351/159.63 |
| 6,974,850 B2 | 12/2005 | McMan | |
| 7,106,509 B2* | 9/2006 | Sharp | G02B 27/288 351/159.6 |
| 7,118,438 B2 | 10/2006 | Ouderkirk | |
| 7,123,418 B2 | 10/2006 | Weber | |
| 7,138,173 B2* | 11/2006 | Wheatley | B32B 7/02 428/212 |
| 7,255,435 B2* | 8/2007 | Pratt | A61F 2/16 351/159.63 |
| 7,372,640 B2* | 5/2008 | Fung | G02C 7/12 359/634 |
| 7,506,977 B1* | 3/2009 | Aiiso | C09B 47/04 351/159.63 |
| 7,791,687 B2 | 9/2010 | Weber | |
| 7,851,054 B2* | 12/2010 | Weber | B32B 7/02 428/212 |
| 8,120,730 B2 | 2/2012 | Weber | |
| 8,403,478 B2 | 3/2013 | Ishak | |
| 2006/0092374 A1* | 5/2006 | Ishak | G02C 7/12 351/159.57 |
| 2007/0216861 A1* | 9/2007 | Ishak | G02C 7/10 351/159.24 |
| 2011/0272849 A1 | 11/2011 | Neavin | |
| 2012/0075577 A1 | 3/2012 | Ishak | |
| 2012/0120515 A1* | 5/2012 | Ishak | G02C 7/04 359/885 |
| 2014/0268031 A1* | 9/2014 | Ambler | G02C 7/104 351/159.64 |
| 2014/0300857 A1* | 10/2014 | Cohen-Tannoudji | G02C 7/104 351/159.63 |
| 2015/0146166 A1* | 5/2015 | Weber | G02C 7/107 351/159.62 |

OTHER PUBLICATIONS

Dijk, "Amplitude Reduction and Phase Shifts of Melatonin, Cortisol and Other Circadian Rhythms after a Gradual Advance of Sleep and Light Exposure in Humans," Plos one, 2012, vol. 7, No. 2, e30037, pp. 1-15.

Hanifin, "Photoreception for Circadian, Neuroendocrine, and Neurobehavioral Regulation", Journal of Physiological Anthropology, 2007, vol. 26, pp. 87-94.

Brainard, "Action Spectrum for Melatonin Regulation in Humans: Evidence for a Novel Circadian Photoreceptor," The Journal of Neuroscience, 2001, vol. 21, No. 16, pp. 6405-6412.

Meijer, "Light Responsiveness and Photic Entrainment of the Mammalian Circadian Clock," The Visual Neurosciences, 2003, vol. 1, pp. 625-640.

Morin, "The circadian visual system", Brain Research Reviews, 1994, pp. 102-127.

Nevitt, "Recent advances in multilayer polymeric interference reflector products," Thin Solid Films, 2013, vol. 532, pp. 106-112.

Santhi, "The spectral composition of evening light and individual differences in the suppression of melatonin and delay of sleep in humans", Journal of Pineal Research, 2012, vol. 53, pp. 47-59.

Skene, "Optimization of Light and Melatonin to Phase-Shift Human Circadian Rhythms" Journal of Neuroendocrinology, 2003, vol. 15, pp. 438-441.

West, "Blue light from light-emitting diodes elicits a dose-dependent suppression of melatonin in humans", Journal of Applied Physiology, 2011, vol. 110, pp. 619-626.

"Aging of Eyes Is Blamed for Range of Health Woes", The New York Times, published Feb. 20, 2012, [retrieved from the internet on May 8, 2014], <http://www.nytimes.com/2012/02/21/health/aging-of-eyes-is-blamed-in-circadian-rhythm-disturbances.html>, 4pgs.

Mann, "Can't sleep? It could be your iPad", CBS Minnesota, Presented on Sep. 4, 2012, [retrieved form the internet on Jan. 20, 2014] URL <http://minnesota.cbslocal.com/2012/09/04/cant-sleep-it-could-be-your-ipad/>, 2 pages.

* cited by examiner

CIRCADIAN RHYTHM OPTICAL FILM

FIELD

The disclosure relates to a circadian rhythm optical film and, in particular, to an optical film that blocks some blue light to reduce circadian rhythm disruption and a color balanced white light transmission.

BACKGROUND

The introduction of handheld and portable devices (e.g., mobile phones and tablet computers) has changed the way people view media. With these devices, bright text, images, and video content is viewed throughout the day. Typically, most of these devices are based on color generating displays (for example, liquid crystalline or organic light-emitting displays). In addition, personal media displays are also used in industrial, medical, or manufacturing settings.

One unintended consequence of viewing these displays is greater exposure to light. It has been found that certain wavelengths of light are projected to regions of the central nervous system responsible for the regulation of circadian rhythms. One downstream molecule that regulates circadian rhythms is melatonin. Melatonin expression is lower during the waking hours and increases shortly before and during sleep. It has been found that blue light suppresses the production of melatonin. For users reading or observing content in the evening hours, this can have the consequence of delaying the onset of sleep. This is particularly an issue for handheld displays due to their closer viewing distance to the eyes. For most users, this may only be a minor inconvenience; however, the dysregulation of circadian rhythms can produce sleep irregularities and is thought to contribute to the development of disorders such as insomnia and diseases such as obesity, diabetes, and others.

BRIEF SUMMARY

The disclosure relates to a circadian rhythm optical film and, in particular, to an optical film that blocks some blue light to reduce circadian rhythm disruption and a color balanced white light transmission. The optical film includes a polymeric edge filter that creates a sharp band edge to provide for quick transitions from low to high transmission of light as a function of wavelength so that a narrow band of problematic blue light is blocked while maintaining transmission of the remaining blue light.

In many embodiments, an optical film includes a polymeric bandstop filter reflecting a band of blue light in a range from 440 nm to 480 nm and transmitting greater than 50% of blue light at a wavelength of 10 nm longer than a long wavelength band edge and at a wavelength of 10 nm shorter than a short wavelength band edge.

In further embodiments, an optical display includes a display panel emitting light and an optical film disposed on the display panel. The optical film includes a polymeric bandstop filter reflecting a band of blue light in a range from 440 nm to 480 nm and transmitting greater than 50% of blue light at a wavelength of 10 nm longer than a long wavelength band edge and at a wavelength of 10 nm shorter than a short wavelength band edge.

In a further embodiment, an optical display includes a display panel emitting light and a multilayer optical infrared reflecting film disposed on the display panel. The multilayer optical infrared reflecting film having a third order harmonic reflecting a band of blue light in a range from 440 nm to 480 nm and substantially transmitting blue light less than 430 nm and greater than 490 nm.

The details of one or more embodiments of the disclosure are set forth in the accompanying drawings and the description below. Other features, objects, and advantages of the disclosure will be apparent from the description and drawings, and from the claims.

BRIEF DESCRIPTION OF THE DRAWINGS

The disclosure may be more completely understood in consideration of the following detailed description of various embodiments of the disclosure in connection with the accompanying drawings, in which.

Figure 1:
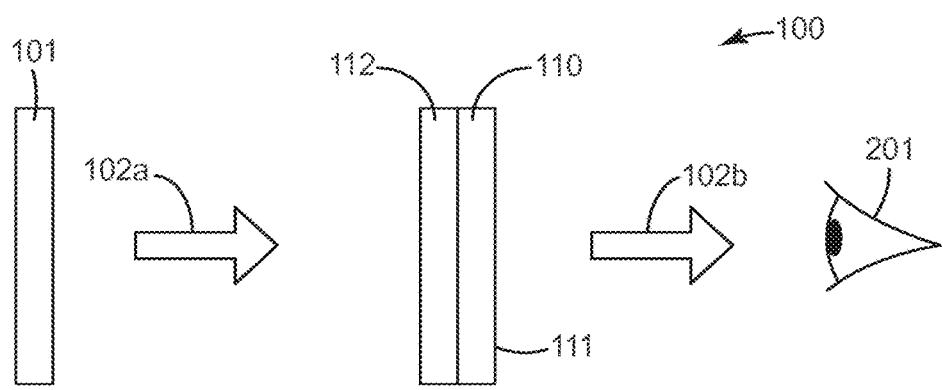
FIG. 1 is a schematic diagram of an optical display observed by an individual.

The schematic drawings presented herein are not necessarily to scale. Like numbers used in the figures refer to like components, steps and the like. However, it will be understood that the use of a number to refer to a component in a given figure is not intended to limit the component in another figure labeled with the same number. In addition, the use of different numbers to refer to components is not intended to indicate that the different numbered components cannot be the same or similar.

DETAILED DESCRIPTION

In the following detailed description, reference is made to the accompanying drawings that form a part hereof, and in which are shown by way of illustration several specific embodiments of devices, systems and methods. It is to be understood that other embodiments are contemplated and may be made without departing from the scope or spirit of the present disclosure. The following detailed description, therefore, is not to be taken in a limiting sense.

All scientific and technical terms used herein have meanings commonly used in the art unless otherwise specified. The definitions provided herein are to facilitate understanding of certain terms used frequently herein and are not meant to limit the scope of the present disclosure.

As used in this specification and the appended claims, the singular forms "a", "an", and "the" encompass embodiments having plural referents, unless the content clearly dictates otherwise.

As used in this specification and the appended claims, the term "or" is generally employed in its sense including "and/or" unless the content clearly dictates otherwise.

As used herein, "have", "having", "include", "including", "comprise", "comprising" or the like are used in their open ended sense, and generally mean "including, but not limited to." It will be understood that the terms "consisting of" and "consisting essentially of" are subsumed in the term "comprising," and the like.

Any direction referred to herein, such as "top," "bottom," "left," "right," "upper," "lower," "above," "below," and other directions and orientations are described herein for clarity in reference to the figures and are not to be limiting of an actual device or system or use of the device or system. Many of the devices, articles or systems described herein may be used in a number of directions and orientations.

The phrase "substantially reflects" refers to transmitting less than 2% of light incident on the element.

The phrase "substantially transmits" refers to transmitting at least 50% of light incident on the element.

The phrase "blue light" refers to light having a wavelength in a range from 400 to 500 nm.

The disclosure relates to a circadian rhythm optical film and, in particular, to an optical film that blocks some blue light to reduce circadian rhythm disruption and a color balanced white light transmission. The optical film includes a polymeric edge filter that creates a sharp band edge to provide for quick transitions from low to high transmission of light as a function of wavelength so that a narrow band of problematic blue light is blocked while maintaining transmission of the remaining blue light. The optical film can block (T is less than 2%) band of blue light in a range from 440 nm to 480 nm and substantially transmit blue light less (shorter) than 430 nm and greater (longer) than 490 nm. The optical film can block (T is less than 2%) band of blue light in a range from 440 nm to 480 nm and transmit greater than 50% of blue light having a wavelength of 10 nm or greater (longer) than a long wavelength band edge and a wavelength of 10 nm or less (shorter) than a short wavelength band edge. This band of blue light can have an average transmission of less than 2% and a width in a range from 40 nm to 10 nm ("FWHM" full height half maximum is defined below). A band of yellow light can be blocked to improve the white balance of the light transmitted through the optical film. A UV absorber can be included to block 400 nm or less light wavelengths. While the present disclosure is not so limited, an appreciation of various aspects of the disclosure will be gained through a discussion of the examples provided below.

Vision research has indicated that the peak sensitivity for the human Circadian clock lies between 440 and 480 nm. The degree to which light exposure affects circadian rhythm is dependent upon many factors, including intensity, duration, wavelength, and exposure time. The light wavelength range where melatonin is suppressed for humans is reported as 420 to 480 nm. Others have suggested a narrower range, from 446 to 484 nm as having the most effect on the circadian cycle. As discussed above, suppression of melatonin can affect the onset of sleep.

The wavelength for peak light emission from blue LEDs (light emitting diodes) or OLEDs (organic light emitting diodes) is near the peak Circadian system response. The blue emission peak is prominent in the emission spectra of substantially all phosphor LED and OLED lighting on the market today and in practically all LCD and OLED based displays. The LCDs are backlit almost exclusively using phosphor coated blue LEDs. The proximity of the peak values of these lighting systems with the Circadian system is unfortunate and the present disclosure is intended to address this problem by blocking much of the light nearest the peak Circadian system response while still transmitting other wavelengths of blue light.

Desirable filtering properties of optical films include a strong rejection band having a longer wavelength band edge in a range from 470 to 490 nm and a shorter wavelength band edge in a range from 430 to 450 nm and optionally a strong but narrow rejection band between 550 and 600 nm (to maintain a white balance), and relatively high transmission at other visible wavelengths so that the filter or optical lens does not have an undesirable or yellow appearance. These polymeric interference filters desirably have a transition from substantially reflecting or blocking light (T<2%) to substantially transmitting light (T>50%) within a wavelength range of 10 nm or less on both band edges. Although such filtering properties may theoretically be obtained solely with absorptive materials such as dyes and pigments, absorptive materials alone are unable to provide a sufficiently narrow and strong rejection bandwidth needed to obtain the color balanced white transmission desired and described herein. In contrast, the polymeric multilayer optical films (polymeric interference filters) can be tailored to have strong blocking (very low transmission, with correspondingly high reflection) at a wavelength of interest, and in a narrow band. The wavelengths quoted for band edges can be for spectrum measured at normal incidence, but that often the film may be used in eyewear or display applications at an angle with respect to the user's eyes. This angle can be 5, 10, 20 or 30 degrees or greater.

The transmissive and reflective properties of multilayer optical films are based on constructive or destructive interference of light at interfaces of (typically) tens, hundreds, or thousands of individual microlayers in one or more layer stacks. By appropriate selection of materials, processing conditions, and thicknesses for the microlayers, the transmission spectrum can be tailored to provide a strong but narrow reflection band, hence strong blocking in a narrow band of blue light, yellow light, or combinations thereof. The narrower the blue blocking band is in wavelength space (while still being spectrally wide enough to reduce circadian rhythm disrupting blue light wavelengths), the less light needs to be blocked in the yellow portion of the spectrum to provide an improved color balance.

FIG. 1 is a schematic diagram side view of an optical display 100 filtering blue light observed by an individual 201. The optical display 100 includes a display panel 101 emitting light 102a through the optical film 110. An optional adhesive layer 112 can fix the optical film 110 to the display panel 101, as desired. The optical film 110 can be a polymeric interference filter as described herein. While the optical film 110 is illustrated as being separated or spaced apart from the display panel 101, it is understood that the optical film 110 can be adhered to or disposed on the display panel 101, as desired.

The polymeric interference filter 110 receives display or LED light 102a and filters selected wavelengths of the light to provide filtered light 102b. The filtered light 102b is perceived by the eyes of an individual 201. The effect of the polymeric filter 110, if designed properly, is to substantially reduce or block circadian rhythm disrupting blue light while simultaneously providing a color balanced white transmission.

In some embodiments the optical film 110 blocks or reflects a band of blue light in a range from 440 nm to 480 nm and substantially transmitting blue light less than 430 nm and greater than 490 nm. The band of blue light having a band floor transmission of less than 2% or less than 1% and a band floor width in a range from 10 nm to 40 nm.

In many embodiments, the optical filter 110 or polymeric interference filter 110 substantially transmits at least 50% of blue light at wavelengths greater than 10 nm longer than the range of blue light being substantially reflected or substantially blocked (10 nm greater than the long wavelength band edge) and substantially transmits at least 50% of blue light at wavelengths less than 10 nm shorter than the range of blue light being substantially reflected or substantially blocked (10 nm less than the short wavelength band edge). In many embodiments, the optical filter 110 or polymeric interference filter 110 substantially transmits at least 70% of blue light at wavelengths greater than 10 nm longer than the range of blue light being substantially reflected or substantially blocked (10 nm greater than the long wavelength band edge) and substantially transmits at least 70% of blue light at wavelengths less than 10 nm shorter than the range of blue light being substantially reflected or substantially blocked (10 nm less than the short wavelength band edge), as illustrated in the Examples below.

In preferred embodiments the polymeric interference filter or optical film 110 is a multilayer optical infrared reflecting film. The multilayer optical infrared reflecting film 110 has a higher order harmonic (second, third, fourth, fifth, sixth, etc.) reflecting a band of blue light in a range from 440 to 480 nm and substantially transmitting blue light greater than 490 nm and less than 430 nm. The optical film can have an average light transmission of less than 2% or less than 1% across a band of blue light from 440 nm to 480 nm and have a band floor width in a range from 10 to 40 nm. In some embodiments the multilayer optical infrared reflecting film 110 reflects at least 99% of all blue light in a range from 440 to 480 nm, from 450 to 480 nm, from 450 to 470 nm, or from 455 to 470 nm and transmits at least 50% or at least 70% of all blue light greater than 490 nm and less than 430 nm. In these embodiments, the multilayer optical infrared reflecting film 110 substantially transmits at least 50% of blue light at wavelengths greater than 10 nm longer than the range of blue light being substantially reflected or substantially blocked and substantially transmits at least 50% of blue light at wavelengths less than 10 nm shorter than the range of blue light being substantially reflected or substantially blocked.

The polymeric interference filter 110 described herein has a sharp band edge at both the long wavelength band edge (LWBE) and short wavelength band edge (SWBE). In many embodiments light transmission goes from less than 1% to greater than 50% or greater than 70% within 10 nm or within 5 nm from the LWBE and SWBE. This is particularly useful in blocking a selective range of light wavelengths while transmitting other visible light wavelengths to provide a desired color balanced transmission. For example blue light wavelengths in a range from 440 nm to 480 nm can be substantially reflected or blocked while substantially transmitting blue light of 490 nm or greater or 430 nm or less. In some embodiments the polymeric interference filter 110 has a blue light reflection band centered at about 460 nm and having a band floor (transmission of less than 5% or less than 2% or less than 1%) width in a range from 5 nm to 25 nm.

The floor of filter 110 can be half as wide as the FWHM value, or greater. The sharper the band edges, the closer the width of the floor is to the FWHM value. In many embodiments the reflected band of blue light (or FWHM value) is in a range from 10 nm to 40 nm or less than 40 nm, less than 35 nm, less than 30 nm, or less than 25 nm wide (FWHM) and transmits less than 2% or less than 1% of light within the reflected floor band and having a floor width that is at least 50% or at least 60% or at least 70% of the FWHM value. In many of these embodiments the reflected band of blue light extends between a long wavelength band edge (LWBE) and a short wavelength band edge (SWBE) which are defined as points p1 and p2 in FIG. 2. The polymeric bandstop filter 110 has a light transmission greater than 70% or greater than 80% within 10 nm or within 5 nm of each of the LWBE and SWBE.

Depending on how much blue light is blocked by the optical lens 100, an amount of yellow light may need to be blocked in order to maintain a color balanced white transmission perceived by an observer 201. This yellow light can be absorbed with a dye or yellow light absorbing material or reflected with the polymeric interference filter 110.

The yellow light absorbing material 111 absorbs light mainly within a range from 560 to 600 nm. The yellow light absorbing material 111 can be disposed between the polymeric interference filter 110 and the observer 201. This is useful to reduce glare if the polymeric interference filter also includes a narrow reflection band for yellow light. Useful yellow light absorbing dyes include Epolight 5819 from Epolin Corporation and dyes ABS 584 and ABS 574 from Exciton Corp. The Epolight 5819 and the Exciton ABS 584 have absorption peaks near 584 nm and the ABS 574 has a peak absorption near 574 nm.

Most dyes have side bands or highly sloping bandedges, so to maintain a narrow FWHM of a combined reflection absorbing bands, the minimum dye loading can be used that will reduce the reflected glare to the desirable range. A 50% or greater reduction in glare is useful. A dye layer with 50% minimum transmission will result in approximately 25% peak glare reflection due to the double pass of glare light back to the user's eye.

In some embodiments the optical filter 110 blocks a second band of light within a range from 560 to 600 nm and is less than 40 nm, less than 35 nm, less than 30 nm, or less than 25 nm wide (FWHM). In some embodiments the polymeric interference filter 110 is a polymeric bandstop filter 110 that reflects a band of yellow light within the range of 560 nm to 600 nm and has a light transmission greater than 50% or greater than 70% within 10 nm or within 5 nm of each side of the "floor" of the reflected band of yellow light. The "floor" is defined herein as the maximum range of wavelengths over which the average transmission of a single rejection band of the filter is less than or equal to 5% or 2% or 1% or 0.1%. The floor of filter 110 can be half as wide as the FWHM value, or greater. The sharper the band edges, the closer the width of the floor is to the FWHM value. In many embodiments the reflected band of yellow light is less than 40 nm, less than 35 nm, less than 30 nm, or less than 25 nm wide (FWHM) and transmits less than 1% of light within the reflected floor band and having a floor width that is at least 50% or at least 60% or at least 70% of FWHM. In many of these embodiments the reflected band of yellow light extends between a long wavelength band edge (LWBE) and a short wavelength band edge (SWBE) which are defined as points p1 and p2 in FIG. 2. The polymeric bandstop filter 110 has a light transmission greater than 70% or greater than 80% within 10 nm or within 5 nm of each of the LWBE and SWBE.

As illustrated in the Examples below, the polymeric interference filter 110 can have one or more light rejection bands. In some embodiments the polymeric interference filter 110 includes both a blue light and a yellow light rejection band. In preferred embodiments these blue and yellow light rejection bands are higher order harmonics of an infrared light reflecting polymeric interference filter 110.

In some embodiments reflecting yellow or green light, the reflected band of light is in a range from 560 to 600 nm or from 530 to 570 nm respectively and the 1% floor of light within a floor band having a width being greater than 20 nm or greater than 25 nm or greater than one half the FWHM value.

Figure 2:
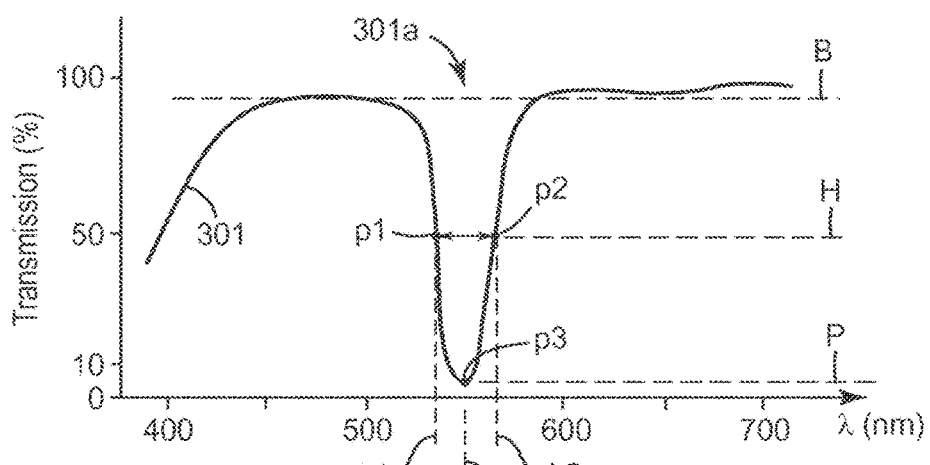
FIG. 2 is a graph of the transmission spectrum of a hypothetical filter and illustrating the concept of full width half maximum.

FIG. 2 is a graph of the transmission spectrum of a hypothetical filter and illustrating the concept of full width half maximum ("FWHM"). The transmission properties of a hypothetical filter, or of one or more components thereof such as a multilayer optical film, are shown in FIG. 2. In this figure, percent transmission is plotted against optical wavelength $\lambda$ in nanometers, the wavelength axis extending over the range from 400 to 700 nm, which is sometimes treated as the human visible wavelength range. The curve 301 may represent the measured transmission of the entire filter, or of one or more individual components thereof, at normal incidence or another design angle of incidence. Without loss of generality, for the remainder of the discussion of this FIG. 2, assume for simplicity that the curve 301 represents the transmission of the entire filter (note however that the filter may in some cases be only a multilayer optical film). The illustrated filter selectively blocks light within a narrow band in a portion of the green region of the visible spectrum, evidenced by the low transmission of the rejection band 301*a* of the curve 301. The rejection band 301*a* may be a reflection band, an absorption band, or the combination of a reflection band and an absorption band.

In order to quantify relevant features of the curve 301, we identify a baseline value B of the curve 301, a peak value P of the curve 301 (in this case the peak value P corresponds to a transmission minimum for the rejection band 301*a*, shown at point p3), and an intermediate value H of the curve 301, halfway between P and B. The curve 301 intersects with the value H at the points p1 and p2, whose wavelength values equal the short wavelength band edge $\lambda 1$ and the long wavelength band edge $\lambda 2$, respectively, of the rejection band 301*a*. The short and long wavelength band edges can be used to calculate two other parameters of interest: the width (full width at half-maximum, or "FWHM") of the rejection band 301*a*, which equals $\lambda 2 - \lambda 1$; and the center wavelength $\lambda c$ of the rejection band 301*a*, which equals $(\lambda 1 + \lambda 2)/2$. Note that the center wavelength $\lambda c$ may be the same as or different from the peak wavelength (see point p3) of the rejection band 301*a*, depending on how symmetrical or asymmetrical the rejection band 301*a* is.

The transmission of the filter (or component(s) thereof) refers generally to the transmitted light intensity divided by the incident light intensity (for light of a given wavelength, incident direction, etc.), but may be expressed in terms of "external transmission" or "internal transmission". The external transmission of an optical element is the transmission of the optical element when immersed in air, and without making any corrections for Fresnel reflections at the air/element interface at the front of the element or for Fresnel reflections at the element/air interface at the back of the element. The internal transmission of an optical element is the transmission of the element when the Fresnel reflections at its front and back surfaces have been removed. The removal of the front and back Fresnel reflections may be done either computationally (e.g. by subtracting an appropriate function from the external transmission spectrum), or experimentally. For many types of polymer and glass materials, the Fresnel reflections are about 4 to 6% (for normal or near-normal angles of incidence) at each of the two outer surfaces, which results in a downward shift of about 10% for the external transmission relative to the internal transmission for light of wavelengths outside of the rejection band. FIG. 2 does not specify which of these transmissions is used, hence, it may generally apply to either internal or external transmission. If transmission is referred to herein without being specified as internal or external, the reader may assume the transmission refers to external transmission, unless otherwise indicated by the context. In many eyewear lenses, the application of surface anti-reflection coatings may result in $T_{internal} \approx T_{external}$.

Figure 3:
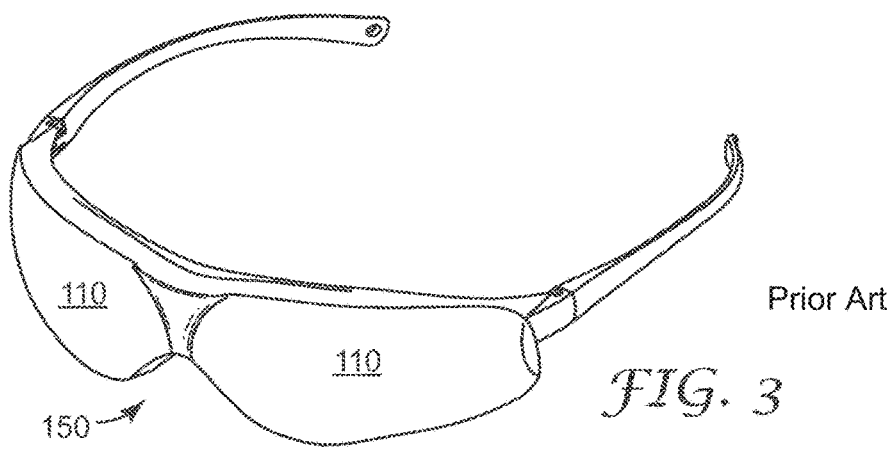
FIG. 3 is a perspective view of illustrative eyewear utilizing the optical film described herein.

FIG. 3 is a perspective view of illustrative eyewear 150 utilizing the optical film 110 described herein. The optical film 110 can be utilized alone in the eyewear or in combination with a polymeric substrate or sandwiched between two substrates. It is understood that the eyewear 150 can have any useful configuration. These optical lenses can be formed by injection molding at elevated temperatures of 200 degrees centigrade or higher and have a thickness of 2 mm or greater. It is surprisingly found that forming the optical lenses described herein at these high temperatures do not degrade the optical reflection properties of the polymeric multilayer interference filters described herein.

In some of these eyewear 150 embodiments, the optical film 110 is laminated to, or sandwiched between polymeric substrates that can be curved. The curved polymeric substrates can be spherically curved as is utilized in eyewear for corrective or sunglasses, for example. In some of these embodiments the optical film 110 is laminated to, or sandwiched between polycarbonate substrates that can be curved.

Multilayer polymeric light reflectors described herein can be fabricated to reflect various narrow bands of violet, blue and yellow light. The reflective films can be made by a continuous process of coextrusion of alternating low and high index polymeric materials and stretching the resulting multilayer polymer web, e.g. as described in U.S. Pat. No. 5,882,774 (Jonza et al.), U.S. Pat. No. 6,531,230 (Weber et al.), and U.S. Pat. No. 6,783,349 (Neavin et al.). The layer thickness profiles were tailored to provide a multilayer optical film that operates as a narrow band reflector, for example, whereby light within the narrow band of wavelengths is highly reflected (with correspondingly low transmission) and light outside of the narrow band of wavelengths is highly transmitted (with correspondingly low reflection). In order to obtain sharpened bandedges, the layer thickness profiles are graded similar to those discussed in U.S. Pat. No. 6,157,490 (Wheatley et al.), and higher order harmonic bands were used as described in U.S. Pat. No. 6,531,230, as well as in a recent publication by T. J. Nevitt and M. F. Weber "Recent advances in Multilayer Polymeric Interference Reflectors" in Thin Solid Films 532 (2013) 106-112.

Multilayer optical films having a narrow reflection band can be made by co-extruding polymer resin layers so as to form relatively narrow reflection bands. The use of highly birefringent materials such as a polyester, in combination with a low refractive index material such as an acrylic, provide for useful refractive index differences between alternating layers which then provide for high reflectivity in the reflection band. Several options exist for making these reflectors. In some cases, the layer thickness profile of the microlayers can be tailored to provide a first-order reflection band (at normal incidence) at a desired visible wavelength. In other cases, the microlayers can be made thicker such that the first-order reflection band at normal incidence is at an infrared wavelength, but a high order harmonic (e.g., a $2^{nd}$, $3^{rd}$, or $4^{th}$ order harmonic) of the infrared band is at the desired visible wavelength. This latter design approach, and subsequent polymer processing techniques, are discussed in U.S. Pat. No. 6,531,230 (Weber et al.).

Assuming relatively small index differentials, such as those available with polymeric mirrors, the reflective power of a given reflectance order of a multilayer stack is inversely proportional to the order number, and it depends greatly on the f-ratio (defined below). The reflective power of a given harmonic band of a multilayer interference reflector is defined as the area under the optical density spectrum of the given band, i.e. the area under the spectral curve of –Log(T) vs. wavelength, normalized for wavelength and after removal of the effects of reflection at the polymer air surfaces (surface reflections are approximately 12% (6% for each surface) for out-of-band wavelengths when PET skin layers are present). For narrow band reflectors, the various higher order harmonics do not overlap and each order has a distinct reflection band and the reflective power can easily be measured. Thus, depending on the number of layers and the materials that one desires to use in the reflector, a given higher order band may not have high enough reflective power to provide the desired reflectivity for a given wavelength range. In that case a lower order reflective band can be used, although the band edges may not be as sharp, i.e. as steep, as a higher order band. The limiting sharpness, or slope of a band edge is inversely proportional to the intrinsic bandwidth (IBW) of a quarterwave stack, which is well known in the art to be given by:

$$IBW = \sin^{-1}[(n_h - n_l)/(n_h + n_l)] \text{ or simply } IBW \approx (n_h - n_l)/(n_h + n_l) \text{ for small index differentials.}$$

For the various higher order harmonic reflection bands, the effective index differential, and therefore the IBW, is reduced by the absolute value of $\sin[n*Pi*f]/n$ where n is the order number and f is the f-ratio.

A $1^{st}$ order reflection band of a given thickness graded multilayer stack can have the same bandedge slope as a third order reflection band of a second material stack if the index differential of the former is one third that of the latter. Alternatively, the effective index differential of a given high and low index material pair can be reduced simply by changing the f-ratio of the layer pair.

The f-ratio of an interference stack is given by f-ratio= $(n_h*d_h)/(n_h*d_h+n_l*d_l)$ where $n_h$ and $n_l$ are the values of the high and low indices of refraction of a layer pair in the stack and $d_h$ and $d_l$ are their thicknesses. Note that in a stack having a graded layer thickness distribution, the low and the high index layer thickness distributions should be graded equally in order to maintain a constant f-ratio throughout the stack.

With 275 layers of PET and coPMMA, there is sufficient reflective power in the 3rd, 4th and 5th order harmonic bands that are illustrated in the examples. Thus, sharper band edges and acceptable reflectivity and bandwidth are generally achievable with several of the higher order bands of PET/coPMMA multilayers that can be fabricated with equipment that is known in the art. The use of higher order bands to achieve sharp band edges with inorganic vapor deposited quarter wave stacks is in general very rare for two reasons: the large index differential of the inorganic material pairs with the subsequent low number of layers produces wide bands with relatively low sloped band edges, and the different approach to stack design wherein automatic computerized stack design prescribes the thickness of each layer using a search algorithm which returns a seemingly random variation of layer thickness. In the latter, it can be difficult to say whether the stack is of any given order, although many thickness values are near the first order values. In addition, the deposition of inorganic coatings typically require high substrate temperatures. Furthermore, the coating cannot be subsequently thermoformed along with the substrate, i.e., the coating must be applied to individual lenses after they are formed to the desired curvature. A uniform coating is difficult to achieve on a curved substrate, particularly a spherically curved substrate, especially in mass production onto large arrays of lenses.

EXAMPLES

Multilayer polymeric reflectors were fabricated that reflect various narrow bands of blue and yellow light. The reflective films were made by a continuous process of coextrusion of alternating low and high index polymeric materials and stretching the resulting multilayer polymer web, e.g. as described in U.S. Pat. No. 5,882,774 (Jonza et al.), U.S. Pat. No. 6,531,230 (Weber et al.), and U.S. Pat. No. 6,783,349 (Neavin et al.). The layer thickness profiles were tailored to provide a multilayer optical film that operates as a narrow band reflector, for example, whereby light within the narrow band of wavelengths is highly reflected (with correspondingly low transmission) and light outside of the narrow band of wavelengths is highly transmitted (with correspondingly low reflection). In order to obtain sharpened bandedges, the layer thickness profiles are graded similar to those discussed in U.S. Pat. No. 6,157,490 (Wheatley et al.), and higher order harmonic bands were used as described in U.S. Pat. No. 6,531,230, as well as in a recent publication by T. J. Nevitt and M. F. Weber "Recent advances in Multilayer Polymeric Interference Reflectors" in Thin Solid Films 532 (2013) 106-112. The term "phase thickness ratio" in the latter publication is the same as the term "f-ratio" used herein to describe the ratio of the thickness of the high index layers to the thickness of the low index layers.

The multilayer reflectors in the following examples were made with stacks of 275 individual microlayers, the microlayers alternating between PET and coPMMA polymer material. The coPMMA is a co-polymer of polymethyl methacrylate, the added polymer being ethyl acrylate of about 20% by weight. The coPMMA is purchased from Arkema, Inc. In all examples the layer thickness values of the stack were tailored to produce a first-order reflection band in the infrared region of the spectrum and the thickness values of the PET, and the PET to coPMMA thickness ratios were tailored, as described in U.S. Pat. No. 6,531,230 (Weber et al.) such that the various higher order harmonic bands reflect blue or yellow light or combinations of blue and yellow light. All multilayer film examples were coextruded with PET protective boundary layers and PET skin layers in addition to the microlayers. The approximate indices of the PET are those commonly found in commercial PET films, i.e. about 1.65 for the in-plane indices and about 1.49 for the thickness direction index. The index of the coPMMA is 1.494. All indices were measured at a wavelength of 633 nm, using the instrument sold by the Metricon Corporation, Pennington N.J.

Example 1

Narrow Band Reflector Centered Near 460 nm

A film with 275 alternating layers of PET and coPMMA was coextruded and oriented with an f-ratio of approximately 0.5 and narrow layer thickness range to give a narrow but highly reflective $3^{rd}$ order harmonic band centered near 460 nm, in the blue region of the spectrum and near the reported peak sensitivity for the human Circadian clock system. A transmission spectrum of the multilayer film is plotted in FIG. 4 along with the emission spectrum of a bare blue (no phosphor) LED. Spectral details of the multilayer film are summarized in Table 1. The FWHM of the multilayer reflection band is about 26 nm (448 nm to 474 nm) and it blocks a large percentage of the blue LED emission. However, the band is narrow enough that it cannot block all of the blue LED light, even as the film spectrum shifts with angle of view, thus permitting sufficient blue light to be transmitted for sufficient color viewing of objects and displays. The transition from 5% T to 70% T for each bandedge is about 6 nm wide. A weak $2^{nd}$ order reflection band is visible near 700 nm due to small deviations from the condition of f-ratio=0.50 for some of the layer pairs in the stack, but this has little impact on the coloration of the film. The average transmission from 454 nm to 469 nm is 0.11 percent (average transmission=0.0011). Thus the 0.1% floor and higher floor widths are greater than at least half of the FWHM value. The average transmission from 400 to 448 nm is 82%. Thus most of the blue light near the peak Circadian response can be blocked while still transmitting substantial amounts of both the shorter and longer wavelength blue light from the LED for maintaining some color balance. Color balance can be optimized with a yellow blocking film which is described in Example 2. The blue reflecting band can easily be constructed to reflect a different set of blue wavelengths as described in Example 3 below.

TABLE 1

Figure 4:
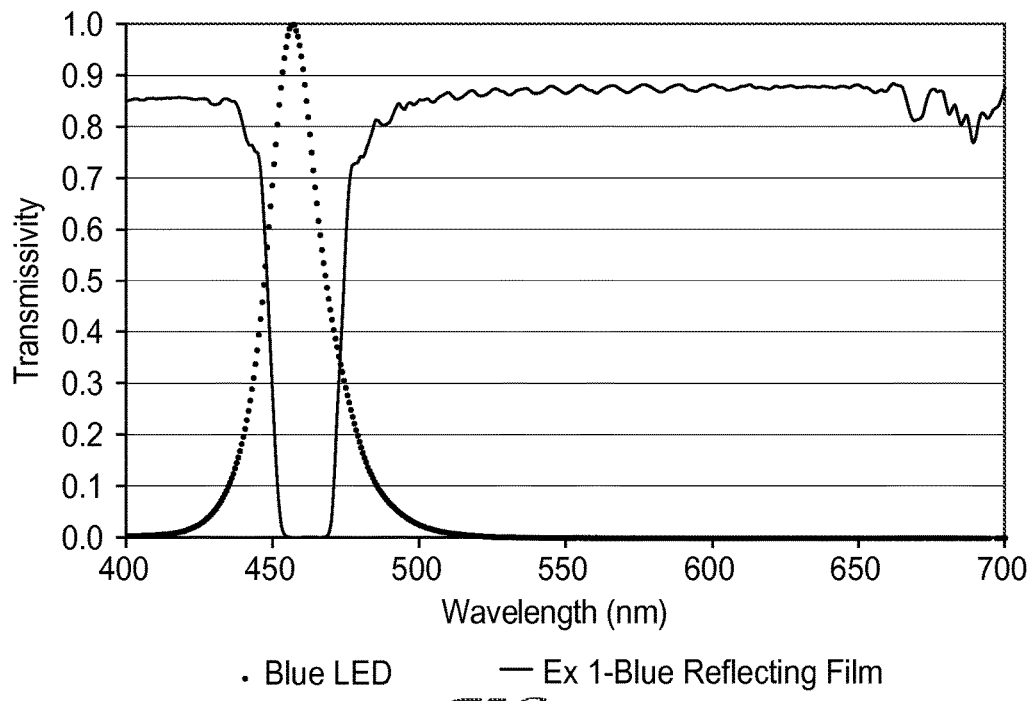
FIG. 4 is a graph of the measured transmission spectrum of a multilayer optical film having a reflection band blocking blue light overlaying a transmission spectrum of a blue LED.

| FIG. 4 Blue blocker | bandwidth (nm) | Avg In-Band Transmissivity | SWBE (nm) | LWBE (nm) |
|---|---|---|---|---|
| FWHM | 26 | 0.0987 | 448 | 474 |
| 5% floor | 22 | 0.0413 | 450 | 472 |
| 2% floor | 20 | 0.0204 | 451 | 471 |
| 1% floor | 18 | 0.0078 | 452 | 470 |
| 0.1% floor | 15 | 0.0011 | 454 | 469 |

Example 2

Yellow Band Reflector for Color Balancing

A film that blocks some blue light will impart a yellow color to its transmitted light. This yellow appearance can be reduced or eliminated by simultaneously blocking a band of yellow light.

A multilayer stack of 275 layers was formed with the same methods described above and in Example 1 to give a $3^{rd}$ order reflectance band centered near 580 nm with a FWHM of about 35 nm. The spectrum is plotted in FIG. 5, along with the spectra of FIG. 4. Spectral details of the multilayer film are summarized in Table 2. Due to its narrow value of both FWHM and Full width at 90% Max (FW90M) of 49 nm, this yellow filter can provide for an improved color balance of films and eyewear that also incorporate the film of Example 1, while blocking very little green or red light. 90% max in this case would be near a measured transmission in air of about 79% since the maximum % T in air is about 88%. A weak 4th order reflection band is visible near 440 nm but this produced no substantial coloring effect.

The desired bandwidth and transmission of the yellow reflection band depend on the desired color transmission of the eyewear. The optimum range for reflection is between 560 and 600 nm. In general, a yellow reflecting filter with a FWHM in the range of about 30 to 50 nm provides a pleasing color for both indoor and outdoor viewing of objects and images.

TABLE 2

Figure 5:
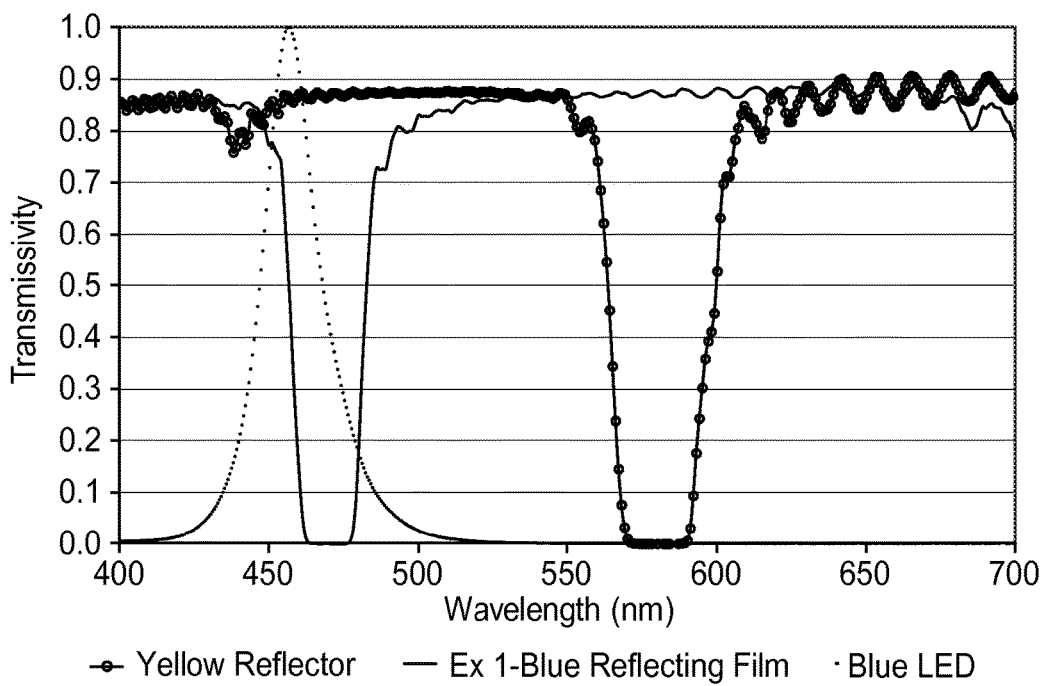
FIG. 5 is a graph of the measured transmission spectrum of a multilayer optical film having a reflection band blocking blue light and a yellow light overlaying a transmission spectrum of a blue LED.

| FIG. 5 yellow blocker | bandwidth (nm) | Avg In-Band Transmissivity | SWBE (nm) | LWBE (nm) |
|---|---|---|---|---|
| FWHM | 35 | 0.1047 | 564 | 599 |
| 5% floor | 29 | 0.0454 | 566 | 595 |
| 2% floor | 26 | 0.0214 | 567 | 593 |
| 1% floor | 24 | 0.0102 | 568 | 592 |
| 0.1% floor | 20 | 0.0011 | 570 | 590 |

Example 3

Narrow Band Blue Reflector Centered Near 477 nm

The optimum filter for promoting a healthy Circadian clock system and simultaneously for providing a satisfactory color viewing eyewear may require compromise in the choice of the wavelength for peak reflectivity of the multilayer filter. The narrowband multilayer filters described here are quarterwave stacks (in the IR) with a graded layer thickness distribution. Such a filter design permits easy adjustment of center wavelength during fabrication of the films via a simple rate adjustment of total polymer flow and/or casting wheel speed. The casting wheel speed adjusts the film thickness by stretching the molten melt curtain before it solidifies on the wheel. In this manner, a second film with 275 alternating layers of PET and coPMMA was coextruded and oriented with an f-ratio of approximately 0.5 and narrow layer thickness range to give a narrow but highly reflective $3^{rd}$ order harmonic band centered at 477 nm, in the blue region of the spectrum and within the range of the reported peak sensitivity for the Circadian clock system. A transmission spectrum of the multilayer film is plotted in FIG. 6 along with the emission spectrum of a bare blue (no phosphor) LED and the spectrum of the yellow filter of Example 2. Spectral details of the multilayer film are summarized in Table 3. The FWHM of the blue reflection band is about 25 nm (465 nm to 490 nm) and it blocks much of the longer wavelengths of the blue LED emission. The shorter wavelengths of the LED emission are substantially transmitted because the transition from 5% T to 70% T for the short wavelength bandedge is about 8 nm wide. At least 80% of the peak LED wavelength emission can be transmitted and the average transmission of the film (in air) from 400 to 460 nm is 85%. Alternatively, this blue reflection band can be made wider while keeping the short wave band edge near 465 nm. For example the bandedges of this blue blocking filter could be placed near 465 and 495 or 500 nm, for FWHM values of 30 nm or 35 nm. These filters would permit the transmission of substantially all (greater than 70%) blue light with wavelengths below 460 nm.

TABLE 3

Figure 6:
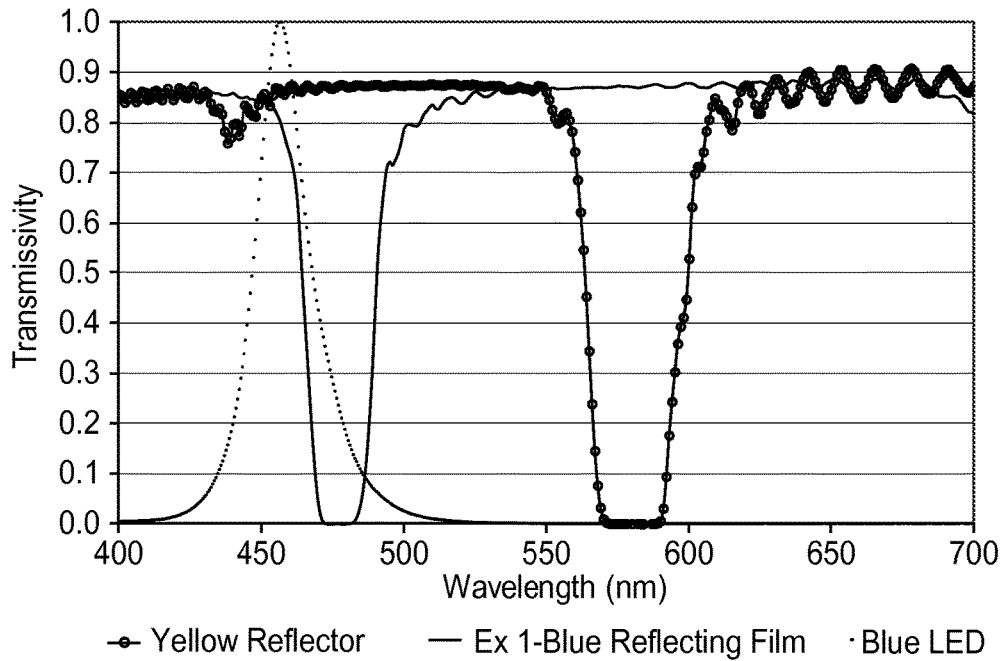
FIG. 6 is a graph of the measured transmission spectrum of another multilayer optical film having a reflection band blocking blue light and a yellow light overlaying a transmission spectrum of a blue LED.

| FIG. 6 Blue blocker | bandwidth (nm) | Avg In-Band Transmissivity | SWBE (nm) | LWBE (nm) |
|---|---|---|---|---|
| FWHM | 25 | 0.1007 | 465 | 490 |
| 5% floor | 21 | 0.0494 | 467 | 488 |

TABLE 3-continued

| FIG. 6 Blue blocker | bandwidth (nm) | Avg In-Band Transmissivity | SWBE (nm) | LWBE (nm) |
|---|---|---|---|---|
| 2% floor | 17 | 0.0172 | 469 | 486 |
| 1% floor | 15 | 0.0083 | 470 | 485 |
| 0.1% floor | 11 | 0.0012 | 472 | 483 |

Example 4

Blue and Yellow Blocker from One Multilayer Stack

Instead of adding a separate yellow interference filter stack for color balance as in the previous Examples, a yellow reflection band can be created with the same stack that creates the blue reflection band in the multilayer stack. This can be done by positioning the $4^{th}$ and $5^{th}$ order bands of an infrared reflector in the yellow and blue portions of the spectrum. The reflector spectrum plotted in FIG. 7 was calculated for a 275 layer stack of PET and co-PMMA having an f-ratio of 0.835. The first order band is centered near 2250 nm. The thickness values were adjusted so the $4^{th}$ order reflectance band would be near 575 nm. The $5^{th}$ order reflectance band is centered near 467 nm and has a FWHM of 23 nm. Spectral details of the multilayer film are summarized in Tables 4 and 5. Alternatively, the $5^{th}$ order harmonic can be located near 575 nm and the $6^{th}$ order harmonic will provide a blue reflection band centered near 480 nm.

TABLE 4

Figure 7:
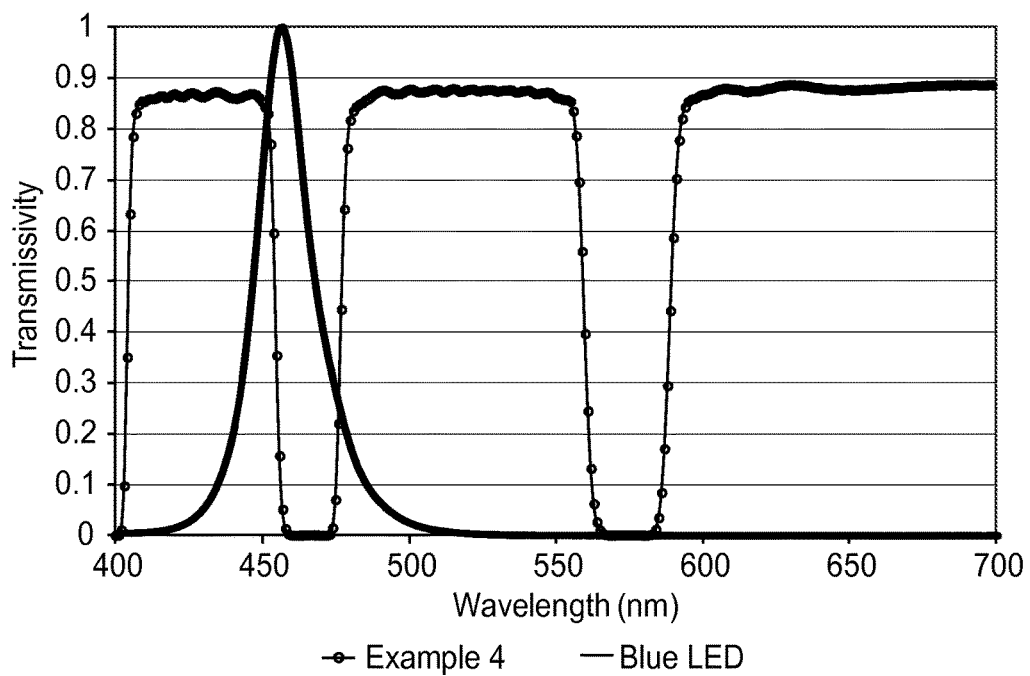
FIG. 7 is a graph of the modeled transmission spectrum of a multilayer optical film having 5th order harmonic reflection band centered near 467 nm and a 4th order harmonic reflection band centered near 575 nm.

| FIG. 7 blue band | bandwidth (nm) | Avg In-Band Transmissivity | SWBE (nm) | LWBE (nm) |
|---|---|---|---|---|
| FWHM | 22 | 0.0583 | 455 | 477 |
| 5% floor | 21 | 0.0408 | 455 | 476 |
| 2% floor | 19 | 0.0162 | 456 | 475 |
| 1% floor | 18 | 0.0088 | 457 | 475 |
| 0.1% floor | 14 | 0.0011 | 459 | 473 |

TABLE 5

| FIG. 7 Yellow band | bandwidth (nm) | Avg In-Band Transmissivity | SWBE (nm) | LWBE (nm) |
|---|---|---|---|---|
| FWHM | 30 | 0.0814 | 560 | 590 |
| 5% floor | 28 | 0.0531 | 561 | 589 |
| 2% floor | 25 | 0.0215 | 562 | 587 |
| 1% floor | 23 | 0.0107 | 563 | 586 |
| 0.1% floor | 15 | 0.0013 | 567 | 582 |

Thus, embodiments of CIRCADIAN RHYTHM OPTICAL FILM are disclosed. One skilled in the art will appreciate that the optical films and film articles described herein can be practiced with embodiments other than those disclosed. The disclosed embodiments are presented for purposes of illustration and not limitation.

What is claimed is:

1. An optical film comprising:
a polymeric bandstop filter reflecting a band of blue light in a range from 440 nm to 480 nm and transmitting greater than 50% of blue light at a wavelength of 10 nm longer than a long wavelength band edge and at a wavelength of 10 nm shorter than a short wavelength band edge, wherein the polymeric bandstop filter comprises a polymeric multilayer optical film comprising a plurality of alternating layers of PET and co-PMMA cooperating to provide
a full width half maximum (FWHM) value in a range from 10 nm to 40 nm, and
a band floor having a transmission being less than 1% and a width of at least 50% of the FWHM value.

2. The optical film according to claim 1, wherein the polymeric bandstop filter blocks a second band of light within a range from 560 to 600 nm and a full width half maximum value being less than 40 nm.

3. The optical film according to claim 1, further comprising an adhesive layer disposed on a first major surface of the polymeric bandstop filter.

4. The optical film according to claim 1, wherein the band of blue light is centered on 460 nm and having a band floor width of 5 nm to 25 nm.

5. The optical film according to claim 1, wherein the polymeric bandstop filter transmits greater than 70% of blue light at a wavelength of 10 nm and longer than a long wavelength band edge and the polymeric bandstop filter transmits greater than 70% of blue light at a wavelength of 10 nm and shorter than a short wavelength band edge.

6. The optical film according to claim 1, wherein the optical film is disposed in an eyewear article.

7. The optical film of claim 1, the polymeric multilayer optical film having 275 alternating layers of a first polymeric material and a second polymeric material.

8. The optical film of claim 1, the polymeric multilayer optical film having an f-ratio of approximately 0.5.

9. The optical film of claim 1, the polymeric multilayer optical film having a third order harmonic reflecting a band of blue light in a range from 440 nm to 480 nm.

10. An optical display comprising:
a display panel emitting light;
an optical film disposed on the display panel, the optical film comprising:
a polymeric bandstop filter reflecting a band of blue light in a range from 440 nm to 480 nm and transmitting greater than 50% of blue light at a wavelength of 10 nm longer than a long wavelength band edge and at a wavelength of 10 nm shorter than a short wavelength band edge, wherein the polymeric bandstop filter comprises a polymeric multilayer optical film comprising a plurality of alternating layers of PET and co-PMMA cooperating to provide
a full width half maximum (FWHM) value in a range from 10 nm to 40 nm, and
a band floor having a transmission being less than 1% and a width of at least 50% of the FWHM value.

11. The optical display according to claim 10, further comprising a yellow light absorbing material disposed on the optical film, wherein the optical film separates the yellow light absorbing material from the display panel.

12. The optical display according to claim 10, wherein the polymeric bandstop filter blocks a second band of light within a range from 560 to 600 nm and a full width half maximum value being less than 40 nm.

13. The optical display according to claim 10, further comprising an adhesive layer fixing the optical film to the display panel.

14. The optical display according to claim 10, wherein the polymeric bandstop filter reflects a band of light centered on 460 nm and having a full width half maximum (FWHM) bandwidth of 25 nm or less.

15. The optical display according to claim 10, wherein the polymeric bandstop filter transmits greater than 70% of blue light at a wavelength of 10 nm and longer than a long wavelength band edge and the polymeric bandstop filter transmits greater than 70% of blue light at a wavelength of 10 nm and shorter than a short wavelength band edge.

16. An optical display comprising:
a display panel emitting light;
a multilayer optical infrared reflecting polymeric film disposed on the display panel, the multilayer optical infrared reflecting polymeric film having a third order harmonic reflecting a band of blue light in a range from 440 nm to 480 nm and substantially transmitting blue light less than 430 nm and greater than 490 nm, wherein the multilayer optical infrared reflecting polymeric film comprises a plurality of alternating layers of PET and co-PMMA cooperating to provide
a full width half maximum (FWHM) value in a range from 10 nm to 40 nm, and
a band floor having a transmission being less than 2% and a width of at least 50% of the FWHM value.

17. The optical display according to claim 16, wherein the multilayer optical infrared reflecting polymeric film blocks a second band of light within a range from 560 to 600 nm and having a full width half maximum (FWHM) bandwidth of 40 nm or less.

18. The optical display according to claim 16, wherein the multilayer optical infrared reflecting polymeric film reflects a band of light centered on 460 nm and having a full width half maximum (FWHM) bandwidth of 25 nm or less.

* * * * *